UNITED STATES PATENT OFFICE.

WILLIAM S. WILLIAMS, OF MIDDLETOWN, DELAWARE.

IMPROVEMENT IN WASHING COMPOUNDS OR FLUIDS.

Specification forming part of Letters Patent No. 159,132, dated January 26, 1875; application filed May 2, 1874.

*To all whom it may concern:*

Be it known that I, WILLIAM S. WILLIAMS, of Middletown, in the county of New Castle and State of Delaware, have invented certain new and useful Improvements in Washing Compounds or Fluids; and I do hereby declare that the following is a full, clear, and exact description thereof, which will enable others skilled in the art to which it pertains to make and use the same.

My invention relates to a washing compound of soda, lime, spirits of hartshorn, alcohol, and water; and to the processes of applying the compound, as hereinafter described.

The compound fluid is made as follows: Add one (1) pound of washing-soda and one-half ($\frac{1}{2}$) pound of quicklime to one (1) gallon of water. After boiling these ingredients for fifteen minutes, and letting them cool, draw off the liquid, and add to it one (1) spoonful of the spirits of hartshorn, and one (1) spoonful of alcohol.

The clothes to be washed should be soaked over night, or at least several hours, rubbed a little, wrung out of the water in which they have been soaked, and thoroughly soaped. To each gallon of water in the wash-boiler is added, before the water is heated, two (2) table-spoonfuls of the compound fluid, and the water is stirred till the compound is thoroughly mixed with it, and while the water is cool the clothes are placed in the boiler, and then boiled, and occasionally stirred for fifteen minutes, by which process, with a little rubbing and the proper rinsing, they are thoroughly cleansed.

A soap, used in combination with the compound fluid, as hereinafter described, is made by adding two (2) pounds of grease to one (1) quart of the compound fluid, which are boiled and stirred together till they thicken to the proper consistency.

The compound fluid, in combination with the above-described soap, is used for cleansing machinists' "waste" in the following manner: To four (4) gallons of cold water in a wash-boiler add about one (1) quart of the compound fluid, and stir till the compound is thoroughly mixed with the water, and in which, while the water is cool, place about four (4) pounds of the waste to be cleansed. Boil these together about twenty (20) minutes, and then pour off the liquid from the waste, and add to the waste the same quantities of cold water and compound fluid, and boil them again about twenty (20) minutes. Then remove the waste from the liquid, and soap it well with the soap made as above specified, and wash it through two waters, using the soap freely in the second as well as the first washing. After the waste is thus washed, soap it well again with the same soap, and boil it again as before, and then rinse it thoroughly, and it is ready to be hung out to dry, and it will be as clean as new waste.

The compound fluid, made of the same ingredients, but of increased quantities, so as to increase its strength, is used for cleansing painted and varnished surfaces, and for removing paint and varnish from wooden or other surfaces. In making the fluid for these purposes the quantities of all of the ingredients, except the water, are doubled, and they are boiled somewhat longer. For example: Two (2) pounds of washing-soda and one (1) pound of quicklime are added to one (1) gallon of water, and are boiled about twenty (20) minutes, and to each gallon of the liquid drained off, as before described, is added two (2) table-spoonfuls of the spirits of hartshorn, and two (2) table-spoonfuls of alcohol.

To remove old paint or varnish, this compound is applied boiling hot, and rubbed off with a rough linen cloth. To cleanse painted and varnished surfaces, the same fluid is applied hot, and immediately rinsed off with cold water.

The compound fluid may be used for destroying insects on fruit and shade trees. To prepare for this, the dirt is removed from the surface of the roots of the trees, and, after the surfaces of the roots are somewhat dried by several days' exposure to the air, the trunk and roots are thoroughly washed with the fluid.

I am aware that the above-named ingredients have been used, with other materials in soaps and washing-fluids; and I claim them only in the compound combination and processes herein specifically named and described.

What I claim as new, and desire to secure by Letters Patent, is—

1. The compound fluid made by employing the materials in the quantities substantially as described.

2. The combination of the fluid with the soap, both made of the materials in the quantities substantially as described.

In testimony that I claim the foregoing as my own invention I affix my signature in presence of two witnesses.

WM. S. <sup>his</sup> × <sub>mark.</sub> WILLIAMS.

Witnesses:
DE WITT C. WALKER,
E. M. HANSON.